Nov. 24, 1964 J. W. FIRTH 3,158,492
SAUSAGE CASING WITH RELEASE COATING
Filed Aug. 8, 1962 2 Sheets-Sheet 2
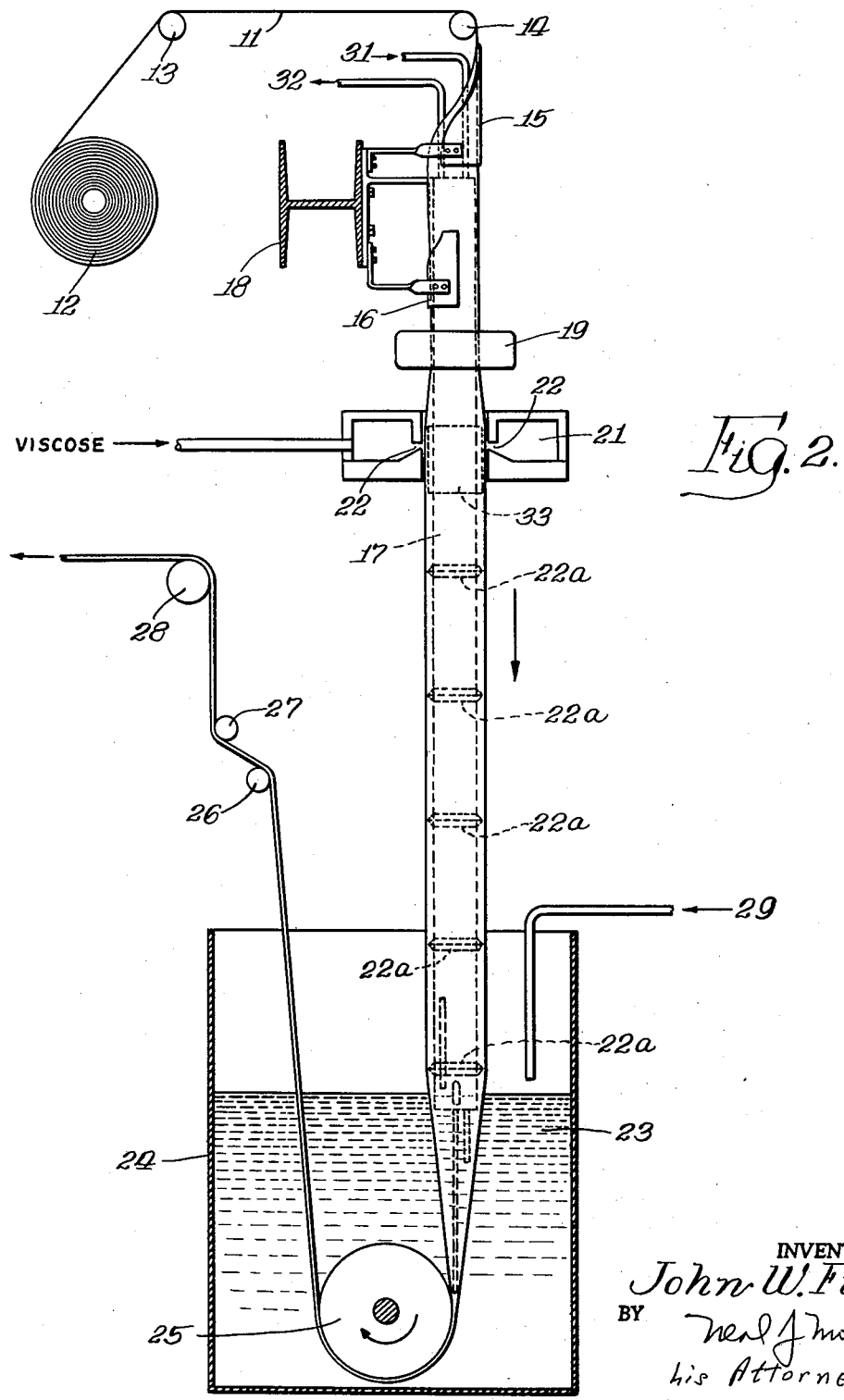
INVENTOR.
John W. Firth,
BY Neal J Mosely
his Attorney United States Patent Office 3,158,492
Patented Nov. 24, 1964

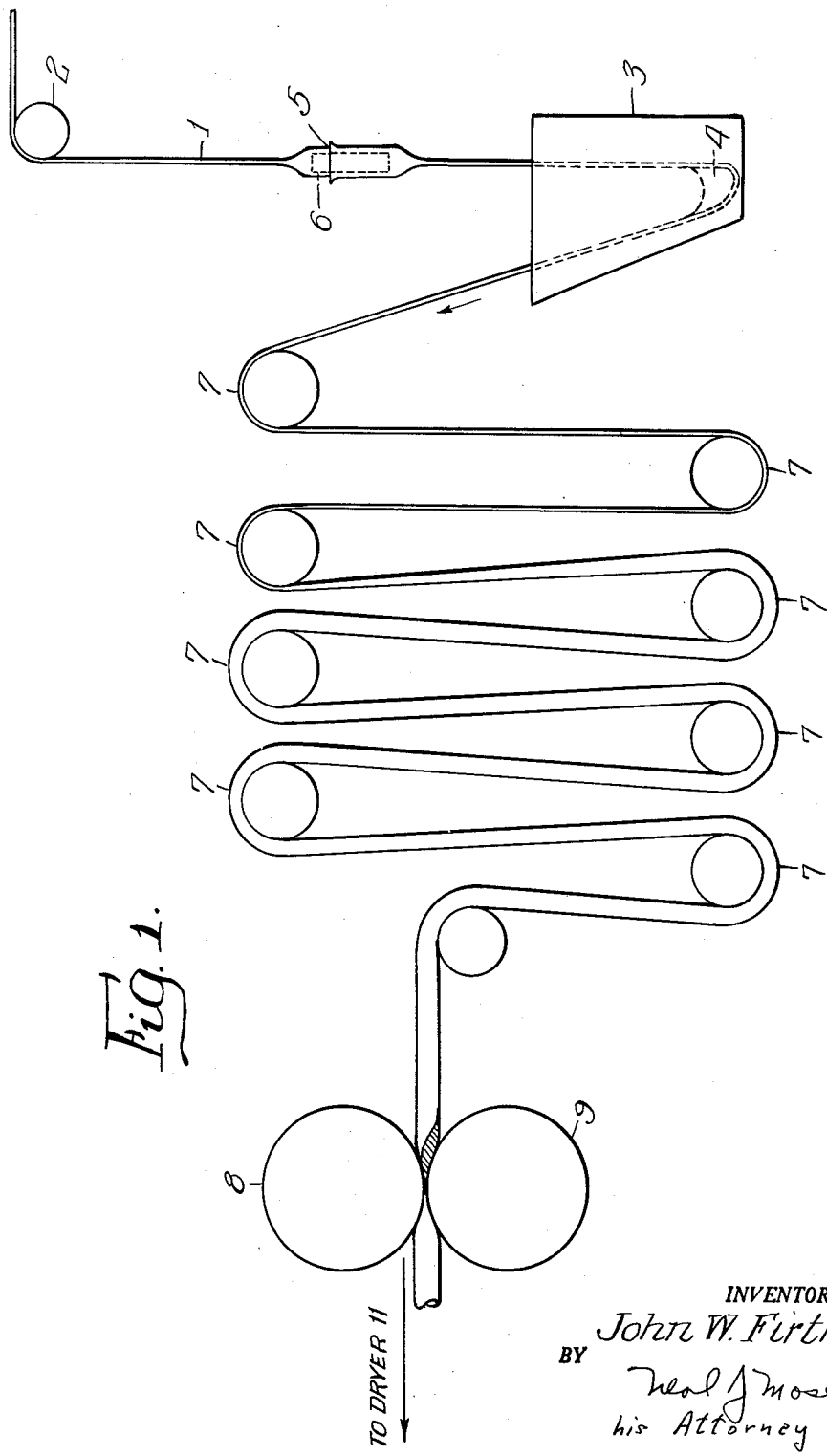

3,158,492
SAUSAGE CASING WITH RELEASE COATING
John W. Firth, Chicago, Ill., assignor to Tee Pak, Inc., Chicago, Ill., a corporation of Illinois
Filed Aug. 8, 1962, Ser. No. 215,725
10 Claims. (Cl. 99—176)

This invention relates to new and useful improvements in the production of sausages in which a cellulosic sausage casing is coated internally with a material which permits ease of removal of the casing from the finished sausage and prevents the development of masses of fat adjacent to the surface of the casing.

There has been considerable consumer acceptance of pre-sliced sausages, such as bologna, salami, etc., which are sold in the form of relatively small, conveniently sized packages, each package containing, as an example, a small predetermined quantity of sausage in the form of a fixed number of slices. The rapid increase in popularity and volume of such packaged sausage has, however, been accompanied by a number of difficulties and problems on the part of the meat packer. For example, in order to provide a predetermined number of slices of sausage in a package of given weight, it is essential that the processing of the sausage be such that the density, diameter, and other physical dimensions, as well as the surface appearance of the sausage, be carefully controlled. The reason for this is that the slicing is performed mechanically, and in high speed packaging it is essential that the dimensional variations of the sausage be held to an absolute minimum. In the preparation of sausages by the meat packer, a sausage emulsion is inserted into a casing which is known in the trade as fibrous casing. Fibrous casing is composed of cellulosic fibers, preferably in the form of a paper, which are impregnated and held together by regenerated cellulose. In the formation of sausages by filling fibrous casings with a sausage emulsion, one of the great problems which has arisen is the tendency of the sausage emulsion to stick or adhere to the inside surface of the casing within which it is contained.

Many attempts have been made to solve the problem of meat sticking to the casing in the preparation of sausage, but no completely satisfactory solution has been found. In the past, suggestions have been made to coat the interior of the casing with fatty or waxy materials of one kind or another prior to stuffing with sausage emulsion. While this procedure does provide some relief from the problem, the problem has not been solved completely since there is still too much adhesion of meat to the casing. In addition, some of the materials which have been used have been of questionable toxicity or have had a tendency to impart undesirable odors, flavors, or colors either to the casing or to the meat product within it. Furthermore, the use of wax and waxy materials as suggested in the past frequently was found to have had a deleterious effect on the necessary permeability of the casing to moisture vapor, smoke, dyeing, and the like. It should be noted that this problem of adhesion of the casing to the meat does not involve merely aesthetics but that substantial losses of materials are involved. When casing is stripped from a bologna prior to slicing, it often contains a substantial and expensive amount of sausage which adheres to the inside of the casing and which is lost as waste which is thrown away with the stripped off casing. A further factor is that when the surface of the stripped sausage is too eroded, it cannot be sold and often must be reworked into a batch of sausage emulsion. Such reworking involves not only additional cost, but may result in an inferior finished product.

In my copending patent application Serial No. 710,916, filed January 24, 1958, now United States Patent 3,106,471, I have disclosed a process for preparing sausages in which the casing is coated with a dimer of a higher organic ketene which becomes chemically bound to the surface of the casing. The casing which is produced by this process does not adhere to the sausage emulsion encased therein and after processing can be readily peeled off from the encased sausage without damaging the meat surface. After extensive commercial use of my aforementioned invention, it was found that the coating of the sausage casing with a diketene solved the problem of adhesion of the casing to the sausage emulsion during processing but was the source of an unsuspected problem of a substantially different nature. Over a period of time in the commercial utilization of my aforementioned invention, it was found that sausages which were prepared using casings coated on the inner surface with a diketene frequently tended to form masses of unsightly fatty material at the surface of the sausage adjacent to the casing, particularly with fatty sausage emulsions and excessive temperatures in processing. This phenomenon is referred to in the meat packing industry as "fatting out." When sausages were prepared using casings coated on the inner surface with a diketene, it was found at times that large masses of fat formed between the surface of the sausage and the casing. In some cases, these masses of fat were evenly distributed around the sausage as a fatty layer while in other cases the fat formed in thick isolated masses. In either case, the product was unsightly and considerably reduced in value if it were saleable at all.

I have now found that casings can be produced which will not adhere to the sausage emulsion encased therein and which after processing can be readily peeled off from the encased sausage without damaging meat surface and without the occurrence of any appreciable "fatting out."

In the practice of my invention, the inside surface of the sausage casing, or if the sausage is made by forming sheet material into a tube, then the surface of the sheet which will become the meat-contacting surface, is contacted with an aqueous emulsion containing as essential ingredients a dimer of a higher ketene, as used in my aforementioned copending application, and a lower alkyl cellulose. I have found that, for some unknown reason, the incorporation of a lower alkyl cellulose into the diketene-coating composition modifies the properties of the coated casing so that the casing can be easily stripped from the sausage which is encased therein and yet does not tend to cause the sausage to "fat out."

INGREDIENTS OF COATING COMPOSITION

In carrying out this invention, the ketenes which are used in the coating composition are diketenes of the formula

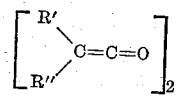

where R' and R" are selected from the group consisting of hydrogen and $C_4$–$C_{20}$ alkyl, aryl, and cycloalkyl radicals, not more than one of the groups R' and R" being hydrogen. These ketenes are generally prepared from naturally occurring fatty acids, and the total number of carbon atoms and subsidiary groups corresponds to the skeleton of the acid from which the ketene was derived. In general, it is preferred to use ketenes (diketenes) which are solid at ordinary temperatures. Such compounds and their production are described further in detail in United States Patent 2,762,270, and emulsions of said ketenes are described in United States Patent 2,856,310. In particular, hexyl ketene dimer, decyl ketene dimer, hexadecyl ketene dimer, hexadecenyl ketene dimer, dodecyl ketene dimer, tetradecyl ketene dimer, octadecyl ketene dimer, dimers of mixtures of ketenes obtainable from fats, oils, and the like, as well as dimers of monomeric, monalkyl, and monoaryl ketenes, dialkyl ketenes, diaryl ketenes, cycloalkyl ketenes, and dicycloalkyl ketenes, and the like, including, for example, phenyl ketene, dioctyl ketene, tolyl ketene, decyl phenyl ketene, cyclohexyl ketene, benzyl ketene, and their dimers.

A commercially available product which is especially useful in the coating of sausage casings is a diketene sold under the trademark Aquapel 380 which is a mixture of alkyl ketene dimers and a small amount of a water miscible emulsifying agent. The product as sold is a flaked white solid which has an apparent molecular weight of about 530, a melting point of 110° F., and a bulk density of about 25 pounds per cubic foot in flake form. Aquapel 380 is prepared from saturated higher fatty acids and has an average of 17 carbon atoms, i.e. 16–18 carbon atoms, in the ketene monomer. The empirical formula for Aquapel 380 is

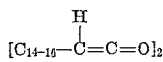

In the coating composition used in carrying out this invention, the lower alkyl cellulose component is preferably methyl cellulose although other lower alkyl celluloses, such as ethyl cellulose, propyl cellulose, or butyl cellulose, can be used.

In carrying out this invention, a mixture of the ketene dimer and the lower alkyl cellulose, preferably in the form of an aqueous emulsion, is applied to the ultimate meat-contacting surface of the casing (or sheet material from which the casing is to be formed) so that an amount in the range from about 0.01 to 0.2% of the ketene dimer and 0.005 to 0.2% of the lower alkyl cellulose, based on the weight of the casing, is incorporated in the casing. Lesser or greater amounts of each ingredient may be used as desired, although, generally, very slight or very great amounts of either ingredient do not materially increase the effectiveness of the treatment. As is noted in my previous patent application, the casing is heated following the coating step to remove water and accelerate the reaction between the ketene component of the coating and the casing surface. The drying step is preferably sufficient to reduce the moisture content of the casing down to 10% and preferably to 5%.

The coating of lower alkyl cellulose and ketene dimer can be applied to the casing surface in any desired way. Thus, application to conventional regenerated cellulose casing, fibrous casing, or any other kind of casing can be made by coating the inside surfaces of the tubular casing by a technique which involves the use of a "bubble" of aqueous solution, emulsion, or suspension of the lower alkyl cellulose and ketene dimer inside the tube. In this method of coating, the casing moves while the bubble of liquid remains still with the result that the inner surface of the casing is wetted and then moves on beyond the bubble to a drying atmosphere.

This technique is better illustrated in the following description of the bubble coating method as applied to a commercial production line of either regenerated cellulose tubing or casing or paper reinforced regenerated cellulose casing which is known in the trade as "fibrous casing."

In the accompanying drawings, there is shown a preferred method of carrying out this invention, in which drawings, FIG. 1 is a diagrammatic view showing the internal coating of casing in accordance with this invention, and FIG. 2 is a somewhat diagrammatic view showing the formation of casing prior to the coating step.

Referring to FIGURE 1 of the drawing, casing which may be wet fibrous casing or wet regenerated cellulose casing 1 in a collapsed flat form is transferred from a bath (not shown) in which the casing has been washed after being impregnated with viscose followed by regeneration, or in the case of regenerated cellulose case after regeneration (both of these being well known procedures for the production of fibrous or regenerated cellulose casing), into a slack box 3, by passage over "carry over rolls" 2. Between the rolls 2 and the slack box 3 an aqueous emulsion containing from 0.01 to 1.0% of Aquapel 380, preferably 0.1% to 1.0%, 0.005 to 1.0% of Methocel (methyl cellulose) and about 0.5% of sodium bicarbonate, is placed within the casing 1, the emulsion being admitted through a cut 5 in the casing 1 before "rubber couplers" 6 are tied into the casing 1. The emulsion can be made by heating water to about 60° C., and in any event above the melting point of the organic ketene dimer, then adding the latter with agitation. The temperature of the water is reduced below the melting point of the ketene dimer to about 35–40° C., and about 0.5% of sodium bicarbonate, based on the total weight of the water, ketene dimer, and methyl cellulose, are added. The resulting emulsion is ready for use at this temperature.

The bubble 4 of the emulsion lies at the bottom of the slack box 3 and as the casing 1 moves as shown, the interior of the casing 1 is progressively contacted with the bubble 4, and is forced open to conform to the configuration of bubble 4. Casing 1 then passes over additional rollers 7 which are subjected to a drying atmosphere, air being maintained within the casing 1 as shown, for size control. The casing 1 then passes through idler roll 8 and bull wheel 9 into dryer 11 (not shown) where it is dried further at a temperature of 200° F. for about 5 minutes. In this last drying stage the ketene dimer continues and/or completes its integration with the casing due, presumably, to reaction between the ketene dimer and the casing surface in contact therewith.

While 0.5% of sodium bicarbonate is a convenient amount and kind of alkaline material used under the particular conditions described, other amounts and kinds of alkaline buffers can be, of course, used, with the desiderata being the obtention of dried casing which is neutral or slightly alkaline. Any well known alkaline buffer which will bring the pH of the emulsion of ketene dimer to about from 7.7 to 8.0 is useable. The advantage of having the inside of the casing at a slightly alkaline, or a neutral condition, is that reaction of ketene dimer with casing is best at these pH's.

Wet regenerated cellulose casing coming off the production line may have a pH of 6.8 to 7.2. With the pH of the ketene dimer—containing aqueous "bubble" at 7.8 to 8.0, the pH of the resulting casing, after drying, will range from about 7.6 to 8.2.

If the pH of the wet regenerated cellulose casing is on the alkaline side (e.g. above about pH 8) the ketene dimer solution is reduced correspondingly in pH. Generally, the pH of the ketene dimer solution or emulsion is in the range from about 6.0 to 8.0 and is selected so that the pH of the casing, after drying, will be only slightly alkaline.

The drying time and temperature are interdependent factors insofar as effecting the drying of the casing and reaction of the dimer with the casing surface are concerned, as will be apparent to those skilled in the art. Other combinations of time and temperature besides those illustrated above can be used, provided, of course, that the temperature is not so high and time not so long that the casing itself is injured due to weakening, discoloration, embrittlement or the like. For the best results a temperature of about 175° F. or higher should be used.

Under the above described conditions, a number of runs were made, using fibrous casing as the casing being treated, as follows:

*Example 1*

Various sizes of casings were coated on the inside using the above-described application technique, the coating fluid containing besides the sodium bicarbonate, various concentrations, as shown in the first column, of Aquapel 380, Aldo-28 (a monoglyceride stearate) and Aldocet which is an acetylated edible monoglyceride composition. Pertinent data is set forth in the following table:

TABLE I

[Fibrous Casing Size 5=(casing weight 6.55 gm./sq. ft.)]

| | Casing Produced (lb.) | Emus'n Used (ml.) | Solid Used, gm. | Gm. Solid/sq. ft. of Casing | Percent Solid |
|---|---|---|---|---|---|
| A. 3% Aldo-28 | 20.2 | 800 | 2.40 | 0.0222 | 0.2617 |
| B. 2% Aldocet 1% Aldo-28 | 23.0 | 800 | 16.0 8.0 | 0.0130 0.0065 | 0.1532 0.0766 |
| C. 0.5% Aquapel-380 | 22.0 | 600 | 3.0 | 0.00254 | 0.0300 |

[Fibrous Casing Size 6=(casing weight 8.04 gm./sq.ft.)]

| | | | | | |
|---|---|---|---|---|---|
| A. 3% Aldo-28 | 43.4 | 2,000 | 60.0 | 0.0264 | 0.304 |
| B. 2% Aldocet 1% Aldo-28 | 40.0 | 2,000 | 40.0 20.0 | 0.0190 0.0095 | 0.222 0.1107 |
| C. 1% Aquapel-380 | 43.6 | 1,500 | 15.0 | 0.00659 | 0.0758 |

[Fibrous Casing Size 7=(casing weight 9.03 gm./sq. ft.)]

| | | | | | |
|---|---|---|---|---|---|
| A. 3% Aldo-28 | 26.9 | 1,900 | 57.0 | 0.0300 | 0.340 |
| B. 2% Aldocet 1% Aldo-28 | 36.6 | 2,230 | 44.6 22.3 | 0.0236 0.0118 | 0.2684 0.1342 |
| C. 0.5% Aquapel-380 | 34.4 | 1,700 | 8.5 | 0.00480 | 0.05507 |

The casings described in Table I were stuffed out and processed to produce spiced luncheon loaf, cotto, and bologna.

The effectiveness of the coatings was evaluated by establishing comparative data on peelability, the adhesion of the casing to the encased finished sausage being measured using a Model Serial No. 325 Dillon tester. The following data are in terms of pounds or fractions of pounds of force required to remove a strip of casing ½ inch wide from the surface of the processed sausage item, the data being listed below in Table II:

TABLE II

| Spiced Luncheon Loaf Size No. 5 | | Bologna Size No. 5 | |
|---|---|---|---|
| A | ¾-1 | A | ½ |
| B | ½-¾ | B | ½ |
| C [1] | 0-⅛ | C [1] | 0-⅛ |
| D | 1 lb. | D | No Reading. |

| Cotto Size No. 7 | | Bologna Size No. 7 | |
|---|---|---|---|
| A | ⅛ | A | ¼-½ |
| B | ¼ | B | ¼-½ |
| C [1] | 0-⅛ | C [1] | ¼ (Casing split during No Reading processing). |
| D | ¼-½ | D | |

| Bologna Size No. 6 | | Bologna Size No. 7 | |
|---|---|---|---|
| A | ¼ | A | ¼-½ |
| B | ¼ | B | ¼ |
| C [2] | 0-⅛ | C [1] | 0-⅛ |
| D | ¼-¾ | D | ¼-½ |

| Bologna Size No. 6 | | Bologna Size No. 7 | |
|---|---|---|---|
| A | ⅛-¼ | A | ⅛-¼ |
| B | ⅛-¼ | B | ¼ |
| C [2] | 0-⅛ | C [1] | 0-⅛ |
| D | ¼ | D | ¼ |

[1] 0.5% solution ketene dimer (Aquapel 380).
[2] 1.0% solution ketene dimer (Aquapel 380).

In the table, A, B and C correspond to the similarly identified casings of Table I; D was a standard fibrous casing.

In every case where part C was tested the edges of the casing would start to curl up immediately after the slits were made. It was then possible to peel the casing easily and with no adhesion of meat to the casing. This was not possible with any of the other products tested.

Over a period of more than three years' commercial use of casings coated with Aquapel 380, it was found that the casings which were so treated could be peeled easily from sausages stuffed therein and with no adhesion of meat to the casing. However, it was also found that a substantial mass or layer of fat frequently tended to develop between the sausage and the casing which is a phenomenon known as "fatting out" in the meat industry. The amount of "fatting out" which occurred with casings which had been coated with Aquapel 380 ranged from relatively slight amounts to very objectionable masses of fat depending upon the composition of the sausage and the processing conditions. This effect was considered highly objectionable by the meat packers and resulted in further experimental work which led to the development of this invention.

*Example 2*

In another series of experiments, various casings were coated on the inside using the above described "bubble" technique but substituting a coating composition containing water, sodium bicarbonate, a diketene, and a lower alkyl cellulose in various proportions.

In one experiment, a fibrous casing was coated on its interior surface using a solution containing 0.2% Methocel (methyl cellulose) and 0.5% Aquapel 380. The solution had a pH of 6.2 and the dried casing had a pH of 8.8. Following the coating and drying of the casing, finished sausages were prepared by stuffing the casing and treating as described above. The casing was evaluated for peelability and tendency of the encased sausage to fat out. An evaluation of several sausages prepared in this casing showed that the casing had peeling characteristics substantially identical to casings prepared using Aquapel 380 as described in Example 1 and further that the sausages had no tendency to fat out. In fact, in recent commercial application of the subject invention, the problem of "fatting out" has substantially disappeared.

In additional experiments, the concentration of Methocel was varied and the concentration of Aquapel 380 maintained constant. A coating composition containing 0.3% Methocel and 0.5% Aquapel 380 was used to coat the interior surfaces of a fibrous casing as described above. The casing was dried and stuffed with sausage emulsion as previously described. An evaluation of several sausages prepared in this manner revealed that the casing had peeling characteristics substantially identical to casings coated only with Aquapel 380 and further that there was no "fatting out" of the sausage. In another experiment, a coating composition containing 0.4% Methocel and 0.5% Aquapel 380 was used to coat the interior surface of a fibrous casing. The peeling characteristics of the resulting casing were found to be substantially identical to casing coated only with Aquapel 380, and there was no "fatting out" of the sausage formed in the casing.

COATING OF FIBROUS CASING DURING FORMING

Another application technique by means of which a coating of ketene dimer (or mixture of ketene dimer and lower alkyl cellulose) can be applied to the inside of a casing, is by applying such coating to the inside of fibrous casing as the latter is being produced in accordance with well known procedures. Fibrous casing is made by passing a ribbon of paper around a mandrel to form a tube, applying viscose to the outside surfaces of the paper tube and inbetween the overlapped portion thereof which is to become a seam, and then passing the tube down through a coagulating bath containing acid wherein regeneration of the viscose takes place, then wasing and drying the tube according to the procedures described for example, in U.S. Patent Nos. 1,937,225 and 2,045,349.

Referring to FIGURE 2 of the drawings a ribbon of paper 11, of the type described in U.S. Patent No. 2,045,349, and which is preferably a long fiber hemp paper weighing 12½ lbs. per ream, passes from roll 12 over rollers 13 and 14 and around formers 15 and 16 which form the paper into tubular form, then proceeds downwardly over the mandrel 17. Mandrel 17 which may be a steel pipe having an outside diameter of 2 to 7 inches, more or less, depending on the size of the tube or casing which is to be produced, may be of any suitable length, conveniently about 30 feet long, and, as shown, can be suspended from a suitable support such as an "I beam" 18 or the like. The paper 11, now shaped in the form of a tube, passes downwardly over the mandrel 17, through a forming ring 19 which is a metallic ring having an inside diameter slightly larger than the diameter of the tube-shaped paper passing through it, and whose purpose it is to maintain the paper in tubular form until it reaches the coating die 21. Coating die 21 is essentially a hollow ring structure made of metal or the like and contains an annular opening 22 circumferentially of its inside diameter through which viscose, which is contained under positive pressure in the chamber of the die 21, is applied to the outer surfaces of the downwardly moving paper tube to uniformly coat it with viscose. A sleeve 33 formed of metal or the like which is shrunk onto the mandrel 17 functions to effect more uniform application of viscose through the orifice 22 as the paper 11 passes downwardly thereover.

A number of slip rings 22a which may be shrunk onto the mandrel 17 every three feet or thereabouts, and which are made of metal or the like, serve to keep the inside wall of the viscose-impregnated paper tube from scraping against the outside wall of the mandrel 17, as the tube moves downwardly.

Continuing in its downward movement the viscose-impregnated paper tube enters a coagulating bath 23 of 5% sulfuric acid contained in a suitable vessel 24. On being contacted with the acid, conversion of the viscose to regenerated cellulose begins and continues as the tube moves around the roller 25, over and under wiper rods 26 and 27, roller 28 and then through washing baths and drying tunnels not shown here, but being similar to those used in the art of making regenerated cellulose casings as exemplified in U.S. Patent 1,937,225 and related patents.

Acid for the bath 23 is supplied through pipe 29. The same kind and concentration of acid is supplied through the inside of the mandrel 17 through a pipe 31, spent acid being removed through pipe 32, at a rate which is balanced by the incoming acid, as shown. The speed of the casing in its downward movement is approximately 20 feet per minute and the contact time in the bath 23 is of the order of 50 seconds.

In applying the coating of ketene dimer and lower alkyl cellulose to the inside of casing such as that described above, I incorporate the ketene dimer and lower alkyl cellulose with the inlet acid which enters at pipe 31. A preferred composition consists of 0.1–1.0% Aquapel 380 and 0.05–1.0% Methocel in the acid solution.

Besides the foregoing techniques for applying coating of ketene dimer and lower alkyl cellulose to the inside surfaces of casing, such coating can also be applied to the surface or surfaces of cellulosic sheets themselves before they are formed into tubes. For example, sheets of cellulose impregnated fibrous sheeting can be treated in accordance with the present invention by applying to the surface thereof ketene dimer and lower alkyl cellulose from a solution, suspension or emulsion in amount sufficient to uniformly coat the surface. After such treatment, the sheeting can be formed into a tube by any conventional technique; ketene dimer and lower alkyl cellulose coating being applied to the sheet after it has been impregnated with cellulose, and conveniently by putting the coating material in a bath through which the sheet passes prior to being dried. It can also, of course, be applied to the sheet after the sheet has been washed and dried.

It is seen from the above that the technique of the present invention results in the production of highly and unexpectedly superior fibrous and other casings with respect to the performance characteristics of such casings when used as containers for sausage items which are designed for "pre-sliced" packaging. The application is simple and lends itself to easy adaptation within the well known commercial fabrication of fibrous casing; it involves the use of extremely small amounts of materials which are relatively easy to apply and which are surprisingly effective for the purpose of this invention, and which do not adversely effect desirable permeability characteristics of the casing with respect to moisture vapor, smoke, dyeing and the like. As described above, the coating of ketene dimer and lower alkyl cellulose is effective to facilitate easy peeling of casing from sausages and to substantially eliminate the problem of "fatting out" of the sausage which was a serious problem for sausage casings prepared in accordance with my aforementioned copending patent application.

While I have particularly described the applicability of this invention to the treatment of regenerated cellulose and fibrous casings, it will be seen that it is also applicable to coating the inside surfaces of such products as regenerated cellulose casing and fibrous casing whose outside surfaces are coated with saran, casings coated on the outside with polymer compositions such as the casings described in U.S. Patent No. 2,812,259 to Arthur Mark, U.S. Patents Nos. 2,627,471 and 2,627,483 to Laurence E. Dowd, Naturine casings, fibrous alginate casings, and the like.

It is, of course, to be understood that the foregoing examples are illustrative only and are not to be construed in a limiting sense since changes within the scope and spirit of my invention will suggest themselves to those skilled in the art.

This application is a continuation-in-part of my copending applications Serial No. 639,435, filed February 11, 1957, now abandoned, and Serial No. 710,916, filed January 24, 1958, now United States Patent 3,106,471.

What is claimed is:

1. A meat casing having the meat-contacting surface thereof coated with a lower alkyl cellulose and a dimer of a ketene of the formula

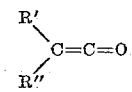

where R' and R" are selected from the group consisting of hydrogen and $C_4$–$C_{20}$ alkyl, aryl, and cycloalkyl radicals, not more than one of the groups R' and R" being hydrogen, at least said ketene dimer being chemically combined with the casing, and said lower alkyl cellulose being present in an amount sufficient to mitigate fatting out of sausages when encased therein.

2. A meat casing in accordance with claim 1 in which said lower alkyl cellulose is methyl cellulose.

3. A meat casing in accordance with claim 2 in which the substituents R' and R" in the ketene dimer are hydrogen and a $C_{14-16}$ alkyl radical, respectively.

4. A cellulosic meat casing having the meat-contacting surface thereof coated with a lower alkyl cellulose and a dimer of a ketene of the formula

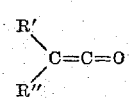

where R' and R" are selected from the group consisting of hydrogen and $C_4$-$C_{20}$ alkyl, aryl, and cycloalkyl radicals, not more than one of the groups R' and R" being hydrogen, at least said ketene dimer being chemically combined with the casing, and said lower alkyl cellulose being present in an amount sufficient to mitigate fatting out of sausages when encased therein.

5. A fibrous meat casing having the meat-contacting surface thereof coated with a lower alkyl cellulose and a dimer of a ketene of the formula

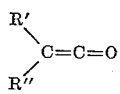

where R' and R" are selected from the group consisting of hydrogen and $C_4$-$C_{20}$ alkyl, aryl, and cycloalkyl radicals, not more than one of the groups R' and R" being hydrogen, at least said ketene dimer being chemically combined with the casing, and said lower alkyl cellulose being present in an amount sufficient to mitigate fatting out of sausages when encased therein.

6. A regenerated cellulose meat casing having the meat-contacting surface thereof contacted with an aqueous emulsion of a lower alkyl cellulose and a dimer of a ketene of the formula

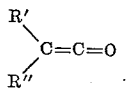

where R' and R" are selected from the group consisting of hydrogen and $C_4$-$C_{20}$ alkyl, aryl, and cycloalkyl radicals, not more than one of the groups R' and R" being hydrogen, at least said ketene dimer being chemically combined with the casing, and said lower alkyl cellulose being present in an amount sufficient to mitigate fatting out of sausages when encased therein.

7. A regenerated cellulose meat casing containing cellulosic fibers having the meat-contacting surface thereof contacted with an aqueous emulsion of a lower alkyl cellulose and a dimer of a ketene of the formula

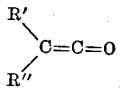

where R' and R" are selected from the group consisting of hydrogen, and $C_4$-$C_{20}$ alkyl, aryl, and cycloalkyl radicals, not more than one of the groups R' and R" being hydrogen, at least said ketene dimer being chemically combined with the casing, and said lower alkyl cellulose being present in an amount sufficient to mitigate fatting out of sausages when encased therein.

8. A method for preventing adhesion of fibrous casing to sausage contained therein and for preventing formation of masses of fat adjacent to the casing which compromises contacting the inner walls of the casing, prior to stuffing with sausage emulsion, with an aqueous emulsion of a lower alkyl cellulose and a dimer of a ketene of the formula

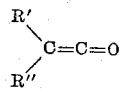

where R' and R" are selected from the group consisting of hydrogen and $C_4$-$C_{20}$ alkyl, aryl, and cycloalkyl radicals, not more than one of the groups R' and R" being hydrogen, at least said ketene dimer being chemically combined with the casing, and containing sufficient lower alkyl cellulose to prevent said formation of fat adjacent to the casing.

9. A method in accordance with claim 8 in which the aqueous emulsion has a ph of about 6.0–8.0.

10. A method in accordance with claim 8 in which the casing is coated with 0.01–0.2% of the ketene and 0.005–0.2% of the lower alkyl cellulose.

References Cited in the file of this patent

UNITED STATES PATENTS

| | | |
|---|---|---|
| 2,627,477 | Downey | Feb. 3, 1953 |
| 2,901,358 | Underwood et al. | Aug. 25, 1959 |
| 2,988,451 | Zahn | June 13, 1961 |
| 3,106,471 | Firth | Oct. 8, 1963 |

UNITED STATES PATENT OFFICE
CERTIFICATE OF CORRECTION

Patent No. 3,158,492                          November 24, 1964

John W. Firth

It is hereby certified that error appears in the above numbered patent requiring correction and that the said Letters Patent should read as corrected below.

Column 5, TABLE I, under the heading "Solid Used, gm.", line 1 thereof, for "2.40" read -- 24.0 --; same column 5, TABLE II, second column thereof, the subtable under the heading "Bologna Size No. 7", first occurrence, should appear as shown below instead of as in the patent:

| A | 1/4-1/2 |
|---|---|
| B | 1/4-1/2 |
| C¹ | 1/4 (Casing split during processing). |
| D | No Reading. | column 10, line 33, for "ph" read -- pH --.

Signed and sealed this 17th day of August 1965.

(SEAL)
Attest:

ERNEST W. SWIDER                      EDWARD J. BRENNER
Attesting Officer                Commissioner of Patents